(12) United States Patent
McDaniel

(10) Patent No.: US 8,255,600 B2
(45) Date of Patent: *Aug. 28, 2012

(54) METHOD AND SYSTEM FOR INTERLOCKING DATA INTEGRITY FOR NETWORK ADAPTERS

(75) Inventor: Scott McDaniel, Villa Park, CA (US)

(73) Assignee: Broadcom Corporation, Irvine, CA (US)

( * ) Notice: Subject to any disclaimer, the term of this patent is extended or adjusted under 35 U.S.C. 154(b) by 38 days.

This patent is subject to a terminal disclaimer.

(21) Appl. No.: 12/897,950

(22) Filed: Oct. 5, 2010

(65) Prior Publication Data

US 2011/0022935 A1    Jan. 27, 2011

Related U.S. Application Data

(63) Continuation of application No. 11/873,858, filed on Oct. 17, 2007, now Pat. No. 7,809,870.

(60) Provisional application No. 60/829,802, filed on Oct. 17, 2006, provisional application No. 60/943,210, filed on Jun. 11, 2007.

(51) Int. Cl.
  *G06F 13/42* (2006.01)
  *G06F 13/00* (2006.01)

(52) U.S. Cl. ......... 710/105; 710/305; 714/759; 714/799

(58) Field of Classification Search ............ 714/714–75, 714/781, 799–807, 759; 710/105, 315, 305
See application file for complete search history.

(56) References Cited

U.S. PATENT DOCUMENTS

| 5,673,279 | A | 9/1997 | Oskouy et al. |
| 6,000,032 | A | 12/1999 | Millard |
| 7,454,667 | B2 | 11/2008 | Joglekar et al. |
| 7,620,878 | B2 | 11/2009 | Seo |
| 2003/0223433 | A1 | 12/2003 | Lee et al. |
| 2006/0064622 | A1 | 3/2006 | Fisher et al. |
| 2011/0022935 | A1* | 1/2011 | McDaniel ............ 714/807 |

* cited by examiner

*Primary Examiner* — Christopher B Shin
(74) *Attorney, Agent, or Firm* — Thomas, Kayden, Horstemeyer & Risley, LLP

(57) ABSTRACT

Certain aspects of a method and system for interlocking data integrity for network adapters are disclosed. Aspects of one method may include executing a plurality of interlocking checks within a network adapter. Each interlocking check may comprise receiving a plurality of input check values associated with a plurality of input data packets corresponding to a first protocol. A plurality of check values may be generated which are associated with the plurality of input data packets and a plurality of output data packets corresponding to a second protocol. The data integrity of the plurality of input data packets and the plurality of output data packets may be validated based on one or more comparisons between one or more of the generated plurality of check values and one or more of the received plurality of input check values.

20 Claims, 12 Drawing Sheets

METHOD AND SYSTEM FOR INTERLOCKING DATA INTEGRITY FOR NETWORK ADAPTERS

CROSS-REFERENCE TO RELATED APPLICATIONS/INCORPORATION BY REFERENCE

This patent application is a continuation of U.S. application Ser. No. 11/873,858 filed on Oct. 17, 2007, which application makes reference to, claims priority to, and claims the benefit of U.S. Provisional Application Ser. No. 60/829,802, filed on Oct. 17, 2006; and U.S. Provisional Application Ser. No. 60/943,210, filed on Jun. 11, 2007.

Each of the above referenced applications is hereby incorporated herein by reference in its entirety.

FIELD OF THE INVENTION

Certain embodiments of the invention relate to network adapters. More specifically, certain embodiments of the invention relate to a method and system for interlocking data integrity for network adapters.

BACKGROUND OF THE INVENTION

The interconnect technology peripheral component interconnect Express (PCIe), was conceived as the heir apparent to the peripheral component interconnect (PCI) technology and utilizes existing PCI programming concepts, but bases it on a much faster full duplex, multi-lane, point to point serial physical-layer communications protocol. The PCIe protocol may be enabled to transfer data at about 250 MB/s per lane, for example.

The PCIe physical layer comprises of a network of serial interconnects like twisted pair Ethernet. A single hub with a plurality of pins may be utilized on the mainboard in order to allow switching and parallelism. The serial interconnects may be grouped in order to provide higher bandwidth. A multi-lane serial design may also be utilized to increase flexibility as a single lane may be provided for slow devices with a relatively small number of pins while more lanes may be provided for fast devices.

The PCIe link may be built around dedicated unidirectional couples of serial, point-to-point connections known as lanes, for example, in contrast to a PCI connection, which is a bus-based system where all the devices may share the same bidirectional parallel bus. The PCIe is a layered protocol that comprises a transaction layer, a data link layer, and a physical layer. The physical layer may be further divided into a logical sublayer and an electrical sublayer. The logical sublayer may be divided into a physical coding sublayer (PCS) and a media access control (MAC) sublayer.

At the electrical level, each lane may utilize two unidirectional low voltage differential signaling (LVDS) pairs at about 2.5 Gbit/s, for example. A connection between any two PCIe devices may be referred to as a link, and may be generated from a combination of one or more lanes. The PCIe devices may be enabled to support single-lane links or wider links. The PCIe protocol enables communication of control messages, including interrupts, over the same links used for data packets.

The data link layer may be enabled to implement sequencing of transaction layer packets (TLPs) that may be generated by the transaction layer. The data link layer may enable data protection via a cyclic redundancy check code (CRC), and an acknowledgement protocol, for example, acknowledgement (ACK) and negative acknowledgement (NACK) signaling. The TLPs that pass a CRC check and a sequence number check may result in an ACK, while those that fail these checks may result in a NACK. The TLPs that result in a NACK, or timeouts that occur while waiting for an ACK, may result in the TLPs being replayed from a special buffer in the transmit data path of the data link layer. The ACK and NACK signals may be communicated via a low-level packet known as a data link layer packet (DLLP). The DLLPs may be used to communicate flow control information between the transaction layers of two connected devices.

The PCIe may utilize a credit based flow control scheme, where a device may advertise an initial amount of credit for each of the receive buffers in its transaction layer. In this scheme, a device may advertise an initial amount of credit for each of the receive buffers in its transaction layer. The device at the opposite end of the link, when sending transactions to this device, may count the number of credits consumed by each TLP from its account. The sending device may only transmit a TLP when doing so does not result in its consumed credit count exceeding its credit limit. When the receiving device finishes processing the TLP from its buffer, it may signal a return of credits to the sending device, which may then increase the credit limit by the restored amount. The credit counters may be modular counters, and the comparison of consumed credits to the credit limit may require modular arithmetic. The advantage of this scheme compared to other methods such as wait states or handshake-based transfer protocols is that the latency of credit return does not affect performance, provided that the credit limit is not encountered, an assumption that is generally met if each device is designed with adequate buffer sizes.

Ethernet is a IEEE standard for simple packet networks including PHY, MAC, and switching services. Ethernet also provides data integrity coverage using a 32-bit CRC for each packet, which may be upgraded up to 1522 B long. When Ethernet networks detect a CRC error, they may drop the packet.

Ethernet networks often carry packets of higher level protocols such as IETF protocols IP, UDP, and TCP. The TCP protocol, for example, provides reliable delivery of data across Ethernet networks by detecting dropped frames and requesting retransmission of the dropped frames.

A plurality of check value types may be used to check data integrity. For example, parity check across each word of a transfer may be performed. The coverage of a parity check may be limited to each word of the transfer covered by its corresponding parity bit. For example, RS-232 may employ a single parity bit that covers a 7-bit or 8-bit character. The parity bit allows signal bit errors to be detected within each word. The error checking correcting code (ECC) used on memory interfaces may be able to detect more errors per word, but may also be limited to a single word. When the data to be transferred comprises a plurality of words, parity and ECC techniques may not be able to detect whether words have been added or removed from the packet or whether words have been moved within the packet or whether words have been swapped between two different packets. To detect these types of errors, a longitudinal check such as a checksum or cyclic redundancy checks (CRC) maybe required. The longitudinal checks may be grouped into associative checks and non-associative checks. Associative checks may be calculated over different parts of the packet and later combined. The parts may not be required to be processed in a specific order.

The checksum is an example of an associative longitudinal check. A checksum may be a 2's compliment or 1's compliment sum of the data. The checksum allows the detection of added or removed data or it may detect multiple bit errors. The checksum may detect data that has been swapped between packets. A checksum may not be able to detect data re-ordered within a packet as the operation is associative, for example, A+B+C==C+B+A.

While certain types of data corruption cannot be detected with a checksum, it has the advantage of being able to be calculated in parts and later combined to create the final checksum. It also allows data within the packet to be modified by making a matching correction in the checksum value. The CRC is a type of non-associative longitudinal check. A CRC may hash the data using a large number of conditional XOR functions between specific bits in the data value that allows the order of data entering the calculation to be verified. An example of a non-associative check may be, for example, $(A\hat{}B)\hat{}((A\hat{}B)?C:\sim C) < > (C\hat{}B)\hat{}((C\hat{}B)?A:\sim A$. A change in the order of the data may be detected with such a non-associated check. This also prevents the modification of data within a packet without making the check value invalid.

PCIe and Ethernet may have chosen a non-associated CRC check value because it can detect more types of corruption and this protection may be needed to detect errors caused by network media and PHY errors. The TCP protocol may choose the associative 1's compliment checksum check value as the associative features of the calculation may allow efficient calculation in software networking stacks.

Cyclic redundancy may be utilized to code information for transmission so that at least some errors may be detected and/or corrected. A cyclic redundancy check (CRC) may be computed for a group or block of bits referred to as frames. The computed CRC may then be appended to each frame for which a CRC is computed and the frame with the CRC may be transmitted. The appended CRC may be referred to as a frame check sequence (FCS). On the receive side, the frame check sequence may be extracted from the received information and a CRC may be computed for the received information. This calculated CRC of the received frame may then be compared with the frame check sequence and if there is a mismatch, then the received frame may be in error.

CRC utilizes very little overhead and may be easily implemented. Many conventional devices currently use CRC to determine if there is an error in information that has been received from a transmitting entity. For example, a receiver may be enabled to determine a CRC on frames in a payload of a received packet. The computed CRC may be compared with a FCS to determine whether the frame is in error. If the frame is determined to be in error and the error may be corrected, then the frame may be acknowledged or passed on for higher level processing. If the frame is in error and the error may not be corrected, then the receiver may either drop the frame which may cause higher level processing to request re-transmission or send an indication or a signal such as a negative acknowledgement, thereby more directly causing the packet to be retransmitted by the transmitter.

The strength of any check value may be measured by the way it covers the data, for example, CRC or checksum value or parity check strength may be related to the ratio of check value size in bits to the data frame size in bits. For example, Ethernet supports a 1500 byte (B) maximum frame size and a 32-bit CRC which may set a minimum check size to data size ratio and a certain protection level. For example, while a small file might be contained in a single Ethernet frame that may be 200 bytes long and have a higher check size to data size ratio, a large file may be split across many Ethernet packets, where each packet may have its own check value. The check size to data size ratio may be a maximum of 1500 B:4 B ratio for Ethernet. The advantage of this segmentation may be more consistent protection, and may allow parts of a large file to be retransmitted when there is an error rather than retransmitting the whole file. The network overhead for error recovery or retransmission may be reduced and the time delay the user experiences during error recovery may be reduced. The same segmentation may be applied to a checksum check similar to TCP.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for interlocking data integrity for network adapters, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for interlocking data integrity for network adapters. Certain aspects of the invention may comprise executing a plurality of interlocking checks within a network adapter. Each interlocking check may comprise receiving a plurality of input check values associated with a plurality of input data packets corresponding to a first protocol. A plurality of check values may be generated which are associated with the plurality of input data packets and a plurality of output data packets corresponding to a second protocol. The data integrity of the plurality of input data packets and the plurality of output data packets may be validated based on a plurality of comparisons between a combination of generated plurality of check values and a combination of received plurality of input check values. A network interface card (NIC) may be enabled to provide data integrity check over an entire data path between an internal system interface check values and data packets and generation and/or validation and an external network interface check values and data packets and generation and/or validation.

Figure 1A:
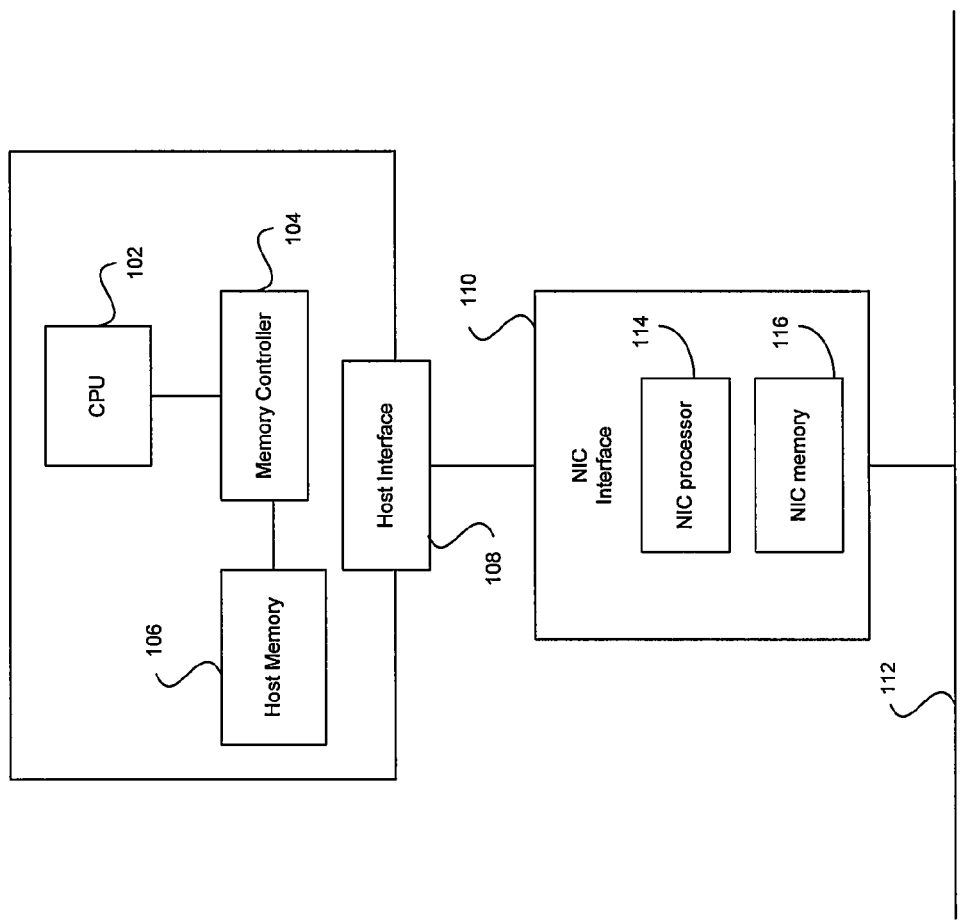
FIG. 1A is a block diagram of an exemplary system with a NIC interface that may be utilized in connection with an embodiment of the invention.

FIG. 1A is a block diagram of an exemplary system with a NIC interface that may be utilized in connection with an embodiment of the invention. Referring to FIG. 1A, the system may comprise, for example, a CPU 102, a memory controller 104, a host memory 106, a host interface 108, a NIC interface 110 and an Ethernet bus 112. The NIC interface 110 may comprise a NIC processor 114 and a NIC memory 116. The host interface 108 may be, for example, a peripheral component interconnect (PCI), PCI-X, PCI-Express (PCIe), ISA, SCSI or other type of bus. The memory controller 106 may be coupled to the CPU 104, to the memory 106 and to the host interface 108. The host interface 108 may be coupled to the NIC interface 110. The NIC interface 110 may communicate with an external network via a wired and/or a wireless connection, for example.

The NIC interface 110 may be enabled to translate or re-format messages from a format used by the host interface 108 into a format required on the external network, for example, Ethernet bus 112. The differences between the two formats may include header formats and addressing within message headers and message size. The NIC processor 114 may be enabled to convert the header and addressing changes. For example, the addressing of headers may change as packets outside the system may not have knowledge of the locations in host memory 106 regarding the location of packets that are stored and retrieved by the NIC interface 110 for access by the CPU 104. The NIC memory 116 may be enabled to store messages when the message size is different between the host interface 108 and the external network, for example, Ethernet bus 112. The external network, for example, Ethernet bus 112 message size may be much larger than the message size supported by the host interface 108, and a number of host interface 108 messages may be collected and combined before transmission of the larger message on the external network, for example, Ethernet bus 112 may start transmission. Similarly, a larger external network, for example, Ethernet bus 112 message may be stored as it is broken into smaller messages on the host interface 108. Other types of manipulation and message processing and re-formatting executed by a NIC interface 110 may be utilized. For example, the messages may be stored in the NIC memory 116 while the processing required to determine and execute re-formatting may be performed by the NIC processor 114.

As more traffic is being communicated through external interfaces, the CPU 102 overhead needed to generate and verify end-to-end checks in host memory 106 may be a performance issue in memory bandwidth as well as CPU cycles. For example, the TCP checksum has traditionally been calculated and verified by the system software stack operating in the CPU 102 over the data messages in host memory 106. Stateless offloads have been developed for adapters to execute these calculations in the NIC 110, thus reducing the CPU 102 cycles and host memory 106 bandwidth. But the NIC 110 has not had the means to provide data integrity coverage for the path from the host memory 106, through the host interface 108 and through the NIC processor 114 and NIC memory 116 to the Ethernet bus 112. The result is that corruptions within the NIC processor 114 or NIC memory 116 may cause the NIC processor 114 to calculate TCP checksums over the corrupted data and the receiver may not be aware whether the data is corrupted or not or the NIC processor 114 may generate a TCP checksum that may indicate that the corrupted data is not corrupted. Statefull offloads, such as TCP protocol offload have created similar issues in the TCP data integrity protection because the TCP checksum and other packet headers needed to verify the TCP checksum may not reach the host memory 106 as they may be generated and processed in the statefull offload within the NIC processor 114.

Figure 1B:
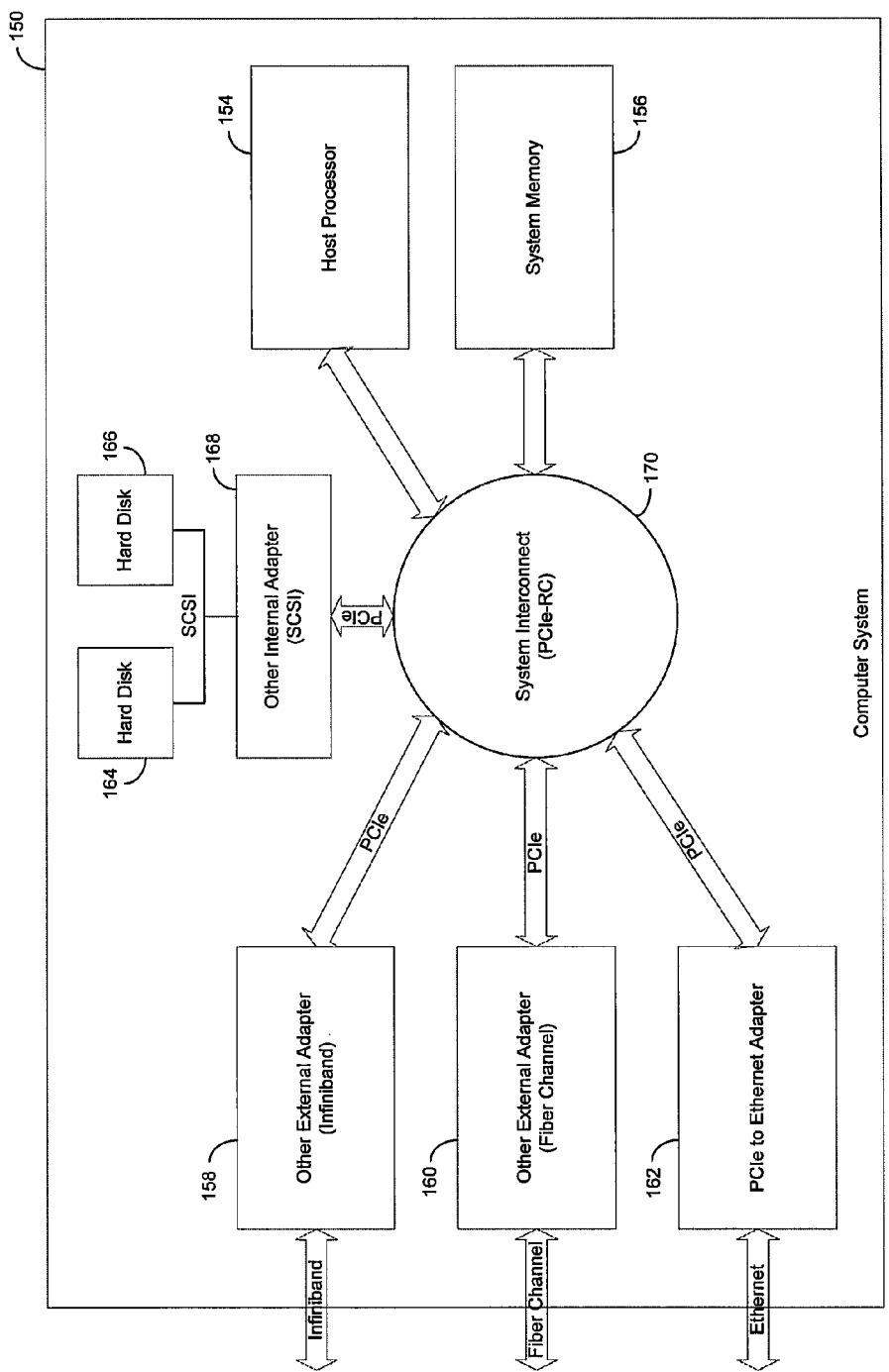
FIG. 1B is a block diagram of an exemplary computer system that may be utilized in connection with an embodiment of the invention.

FIG. 1B is a block diagram of an exemplary computer system that may be utilized in connection with an embodiment of the invention. Referring to FIG. 1B, there is shown a computer system 150 that comprises a host processor 154, a memory 156, an Infiniband external adapter 158, a Fiber Channel external adapter 160, a PCIe to Ethernet adapter 162, a small computer system interface (SCSI) internal adapter 168, a plurality of hard disks 164 and 166, and a system interconnect 170.

The system interconnect 170 may be a PCIe root complex (RC) switch, for example. The system interconnect 170 may be enabled to couple the host processor 154 and system memory 156 with a plurality of network adapters, for example, the SCSI internal adapter 168, the Infiniband external adapter 158, the Fiber Channel external adapter 160, and the PCIe to Ethernet adapter 162 based on a PCIe bus, for example.

The Infiniband external adapter 158 may comprise suitable logic, circuitry, and/or code that may be enabled to interface and switch data packets between a PCIe protocol and an Infiniband protocol. The Fiber Channel external adapter 160 may comprise suitable logic, circuitry, and/or code that may be enabled to interface and switch data packets between a PCIe protocol and a Fiber Channel protocol. The PCIe to Ethernet adapter 162 may comprise suitable logic, circuitry, and/or code that may be enabled to interface and switch data packets between a PCIe protocol and an Ethernet protocol. The SCSI internal adapter 168 may comprise suitable logic, circuitry, and/or code that may be enabled to interface and switch data packets between a PCIe protocol and a SCSI protocol. The SCSI internal adapter 168 may be coupled to a plurality of hard disks, for example, hard disks 164 and 166.

The PCIe link may be built around dedicated unidirectional couples of serial, point-to-point connection known as lanes, for example, in contrast to a PCI connection, which is a bus-based system where all the devices may share the same bidirectional parallel bus. The PCIe is a layered protocol that comprises a transaction layer, a data link layer, and a physical layer. The physical layer may be further divided into a logical sublayer and an electrical sublayer. The logical sublayer may be divided into a physical coding sublayer (PCS) and a media access control (MAC) sublayer.

The plurality of network adapters, for example, the SCSI internal adapter 168, the Infiniband external adapter 158, the Fiber Channel external adapter 160, and the PCIe to Ethernet adapter 162 may be utilized in computer systems to adapt one communication technology from outside the system into another technology used within the system. Notwithstanding, other network technologies that may be used outside the system may include keyboard and video interfaces, for example. Notwithstanding, other network technologies that may be used within the system may include PCI, Hypertransport, advanced technology attachment (ATA), serial ATA (SATA), system management bus (SMBus), front side bus (FSB), universal serial bus (USB) for example.

In bladed server systems, the number of network types may be reduced by removing the internal SCSI technology that may be used to connect to a disk drive within the system. For example, the disk drive may be located across a Fiber channel or an Ethernet network, or the external video, keyboard, and mouse interfaces may be removed and the data may be communicated over an Ethernet network.

The plurality of network adapters, for example, the SCSI internal adapter 168, the Infiniband external adapter 158, the Fiber Channel external adapter 160, and the PCIe to Ethernet adapter 162 may be enabled to translate messages between the PCIe protocol utilized within the system to a message format supported with the connected network irrespective of whether the connected network is within the system, for example, SCSI or outside the system, for example, Infiniband, Fiber Channel, or Ethernet. In each case, different check values may be utilized on each side of the adapter and the message size may be different on either side of the adapter.

In accordance with an embodiment of the invention, the method may be implemented in a plurality of adapter scenarios as illustrated in FIG. 1A and FIG. 1B, where a bulk of data passing through the adapter is not modified, but extensive header processing and data re-segmentation and alignment are being performed within the adapter or NIC interface 110.

Figure 1C:
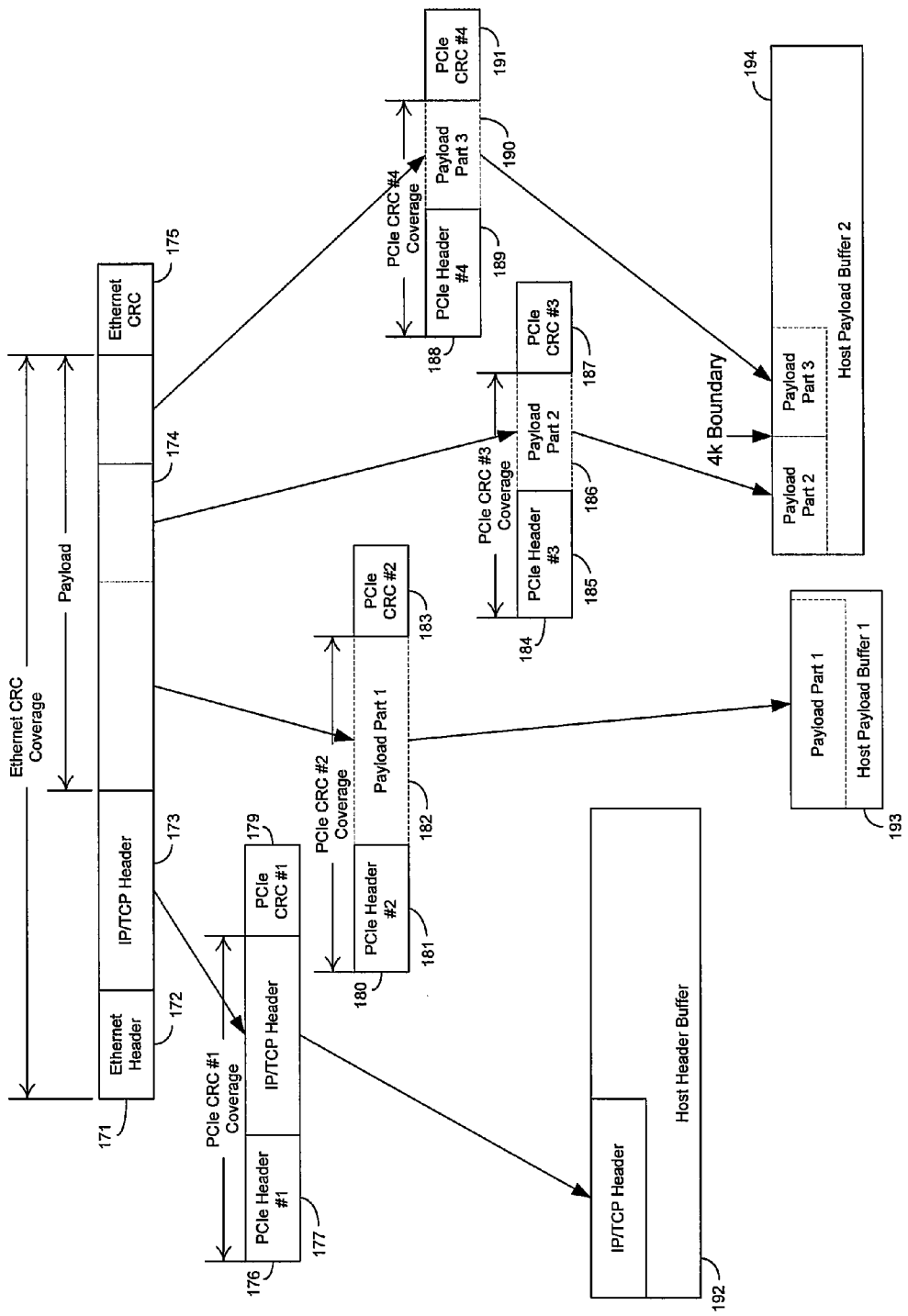
FIG. 1C is a diagram illustrating exemplary repackaging of an Ethernet frame into multiple PCIe frames by a network adapter before being placed in host memory buffers, in accordance with an embodiment of the invention.

FIG. 1C is a diagram illustrating exemplary repackaging of an Ethernet frame into multiple PCIe frames by a network adapter before being placed in host memory buffers, in accordance with an embodiment of the invention. Similar repackaging may be performed in the plurality of adapters illustrated in FIG. 1B. Referring to FIG. 1C, there is shown an incoming Ethernet frame 171. The Ethernet frame 171 comprises an Ethernet header 172, an IP/TCP header 173, a TCP payload 174, and an Ethernet CRC 175. The Ethernet CRC 175 may cover the entire Ethernet frame 171. The NIC 110 may convert the Ethernet frame 171 into, for example, 4 PCIe messages or transaction layer packets (TLPs) 176, 180, 184 and 188. The PCIe message 1 176 may comprise a PCIe header 1 177, the IP/TCP header 173 and a PCIe CRC 1 179. The PCIe message 2 180 may comprise a PCIe header 2 181, a payload part 1 182 and a PCIe CRC 2 183. The PCIe message 3 184 may comprise a PCIe header 3 185, a payload part 2 186 and a PCIe CRC 3 187. The PCIe message 4 188 may comprise a PCIe header 4 189, a payload part 3 190 and a PCIe CRC 4 191.

The NIC 110 may be enabled to check the Ethernet CRC 175 and strip the Ethernet header 172 and the Ethernet CRC 175 from the Ethernet frame 171. The NIC 110 may also provide header/data separation, a form of stateless offload, which places the IP/TCP header 173 of the Ethernet frame 171 in a different buffer, for example, host header buffer 192 in host memory 106 rather than the TCP payload. The NIC 110 may be enabled to spread the payload 174 across multiple host buffers, for example, payload part 1 182 in host payload buffer 1 193, payload part 2 186 and payload part 3 190 in host payload buffer 2 194, if the payload 174 does not fit into a single buffer. These features may require plurality of PCIe transactions, for example, 4 PCIe transactions. One PCIe transaction may be needed for the IP/TCP header 173 as it may be in a different host location from the remaining data for the header/data separation feature. For example, the first data buffer available may not be able to hold the complete payload 174 data, and a portion that fits may be written to the first payload buffer, for example, host payload buffer 1 193. The remaining portion of the TCP payload 174 may fit within host payload buffer 2 194, but since the buffer crosses a 4 KB address boundary, PCIe requires that the operation be split into 2 PCIe transactions. Notwithstanding, the Ethernet frame 171 may be broken down for other reasons such as a maximum payload size limit of PCIe, for example, set to 128 B or due to other services being provided by the NIC 110.

The Ethernet CRC 175 may not be directly usable as a check value for validating the data in each of the PCIe transactions. Different CRC polynomial equations may be used for the two check values, and they may cover different portions of the data and headers that are not included in both messages. As a result, adapters may not provide a data integrity check over the segmentation features. For example, the PCIe CRC may be calculated on the data that arrives at the PCIe block to be transmitted by the host memory 106. If that data has been corrupted, the NIC 110 may not be able to detect it at that time.

The NIC processor 114 may provide ECC or parity check values for data words stored in the NIC memory 116 by generating the check value as a word is written into the NIC memory 116 and validating the check value when the word is read from the NIC memory 116. While the NIC interface 110 may be able to detect corruptions of individual words within the NIC memory 116, it may not be able to detect when the NIC memory 116 may write or return an incorrect word and the NIC interface 110 may not be able to verify that the values written and read were not corrupted in the logic between the interfaces and the NIC memory 116.

In addition to the PCIe transactions not being of the same size as the external network packet sizes, PCIe technology may allow read operations for different segments of an Ethernet packet from host memory 106 to arrive at the NIC processor 114 in a variable order. This may prevent the use of a non-associative check value like the Ethernet CRC to cover PCIe segments as the order of processing as they arrive may not be guaranteed or consistent.

Figure 2A:
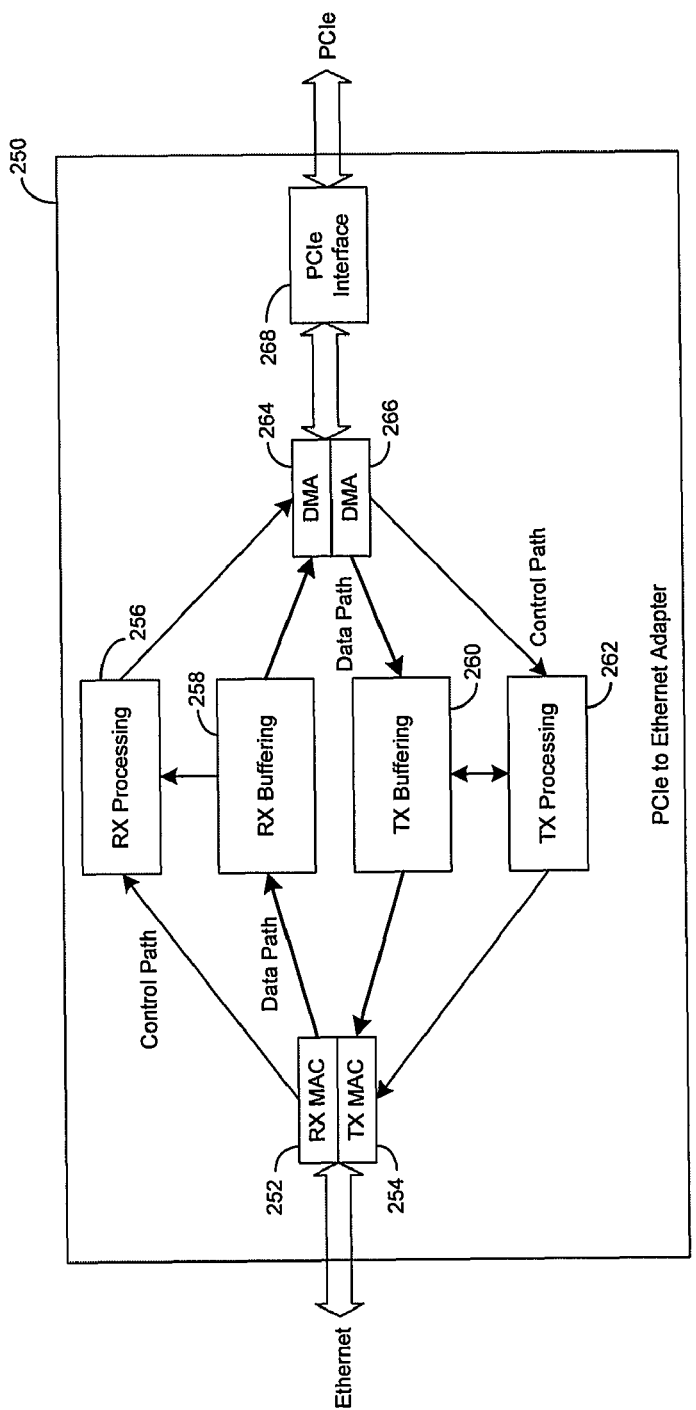
FIG. 2A is a block diagram of an exemplary PCIe to Ethernet adapter that may be utilized in connection with an embodiment of the invention.

FIG. 2A is a block diagram of an exemplary PCIe to Ethernet adapter that may be utilized in connection with an embodiment of the invention. Referring to FIG. 2A, there is shown a PCIe to Ethernet adapter 250. The PCIe to Ethernet adapter 250 may comprise a receive medium access protocol filter (RX MAC) 252, a transmit MAC filter (TX MAC) 254, a receive (RX) processing block 256, a transmit (TX) processing block 262, a RX buffering block 258, a TX buffering block 260, a write direct memory access (DMA) 264, a read DMA 266, and a PCIe interface 268.

The RX MAC 252 may comprise suitable logic, circuitry and/or code that may be enabled to receive packets and store the received packets in the RX buffering block 258. The received packets may be based on an Ethernet protocol, for example. The RX MAC 252 may be enabled to verify the Ethernet CRC value of the received packet and accordingly allow or block the received packet. The RX MAC 252 may be enabled to pass the control information of the received packet, for example, the length, and the receive buffer location to the RX processing block 256 while passing the packet to the RX buffering block 258.

The RX processing block 256 may comprise suitable logic, circuitry and/or code that may be enabled to determine the location or locations of placement of the received packet in the host. For example, the RX processing block 256 may be enabled to place the received packet in a next available empty RX host buffer or buffers. The information associated with the available empty RX host buffers may be obtained from a buffer list within the NIC, for example. The RX processing block 256 may be enabled to parse the received packet and use the classification information to determine how the packet is to be placed in the host. The RX processing block 256 may be enabled to check the TCP checksum of the received packet. In accordance with another embodiment, it may be common for the RX MAC block 252 to be enabled to parse the received packet and provide classification information of the received packet via the control path to the RX processing block 256. The RX MAC block 252 may be enabled to check the TCP checksum of the received packet.

The RX processing block 256 may be enabled to split a large received packet into a plurality of segments and place the split segments in multiple host buffers. The RX processing block 256 may be enabled to separate the header from the payload of the received packet by placing segments of the received packet into different buffers. The RX processing block 256 may be enabled to provide state-full offload features by parsing the packet, associating it with a specific packet stream or connection, and utilizing and modifying state values associated with that connection to determine where in the host the payload portion of the packet needs to be placed, reducing the need for host network processing and eliminating the PCIe bandwidth needed for the packet headers. The RX processing block 256 generates a control command to the DMA write block 264 that indicates where in host memory 106 the various portions of the received Ethernet packet 171 are to be placed.

The RX buffering block 258 may be enabled to provide buffering for the Ethernet packet 171 in order to allow the Ethernet CRC 175 to be validated before consuming valuable PCIe or host memory 106 bandwidth. The host memory 106 may be required to allow time for the RX processing block 256 to complete its determination on where the packet is to be placed.

The write DMA 264 may comprise suitable logic, circuitry and/or code that may be enabled to move portions or segments of the packet to various host locations after the received packet has been processed and the host locations for the received packet have been determined. The write DMA 264 may receive a command from the RX processing block 256 that may indicate the data placement operations. The write DMA 264 may receive the data for the segments from the RX buffering block 258 and communicate the received data to the PCIe interface 268. Each segment communicated to the PCIe interface 268 may include host address information so that the PCIe interface 268 may be enabled to create a TLP from that data segment. Following placement of the packet information in the host, a flag may be set, for example, to indicate to the system that the packet has arrived and has been placed in the host. In another embodiment, interrupts may be used to indicate to the host that additional data is ready to be processed. The PCIe interface 268 may be enabled to convert the segments created by the write DMA 264 into a PCIe protocol packet and communicate the packet to the host. A part of this task may comprise calculating the PCIe LCRC value.

On the transmit side, the DMA read 266 may comprise suitable logic, circuitry and/or code that may be enabled to read one or more segments of data from the host that need to be combined into an Ethernet packet and transmitted. The DMA read 266 may be enabled to communicate the segments to be transmitted to the TX buffering block 260 while communicating that the segments are ready for processing to the TX processing block 262.

The TX processing block 262 may comprise suitable logic, circuitry and/or code that may be enabled to combine one or more segments from the DMA read 266 with header information generated on-chip to create an Ethernet packet that needs to be transmitted. The TX processing block 262 may be enabled to determine the location of the segments to be transmitted in the host memory 106. The TX processing block 262 may be enabled to review and create check values over the segments in the TX buffering block 260. The TX processing block 262 may be enabled to modify the data segments in the TX buffering block 260 that were communicated from the host or may add data depending on the type of service the adapter provides. The TX MAC 254 may comprise suitable logic, circuitry and/or code that may be enabled to combine the data segments from the TX buffering block 260 as directed by the TX processing block 262, calculate and append the Ethernet CRC 175, if necessary, and transmit the packet onto the Ethernet network 112.

Figure 2B:
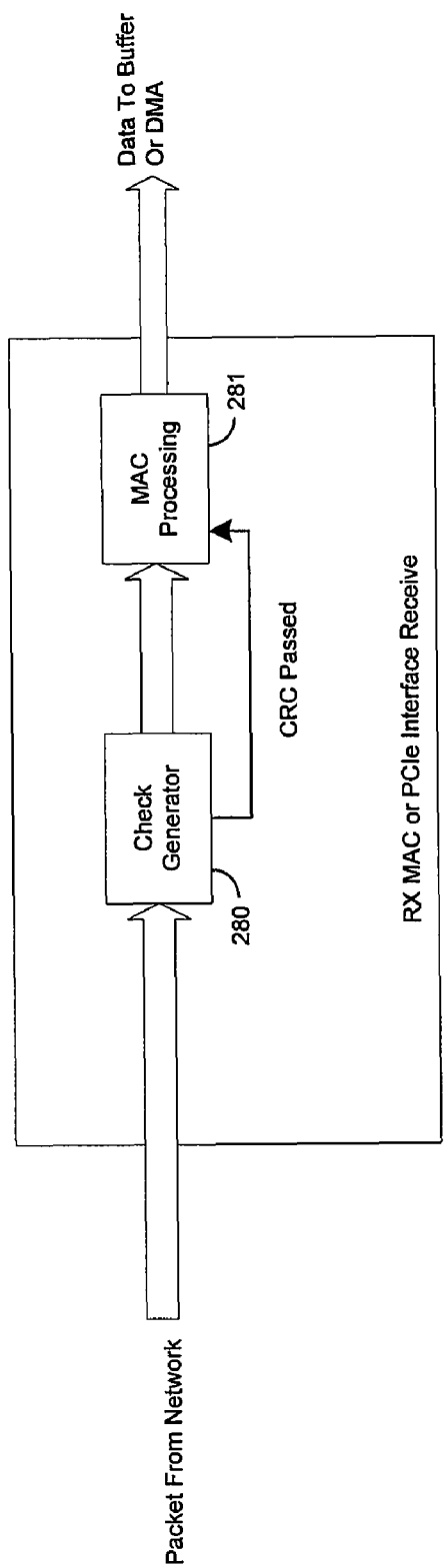
FIG. 2B is a block diagram of a CRC check value calculation for packets received from a network that may be utilized in connection with an embodiment of the invention.

FIG. 2B is a block diagram of a CRC check value calculation for packets received from a network that may be utilized in connection with an embodiment of the invention. Referring to FIG. 2B, there is shown a CRC check generator 280 and a MAC processing block 281. The CRC check value validation may be applicable for the Ethernet RX MAC 252 or the PCIe interface 268. A packet may arrive from the network and a CRC may be calculated in the CRC check generator 280 over the packet, before it is buffered or further processed so that the erroneous packet may be prevented from harming the adapter. The CRC pass/fail indication may be passed by the check CRC generator 280 to the MAC processing block 281. The MAC processing block 281 may comprise a filter circuit that may cause the packet to be dropped or discarded if the CRC has an error. In Ethernet, no further action may be taken. In PCIe, a NACK message may be generated to cause the packet to be retransmitted.

Figure 2C:
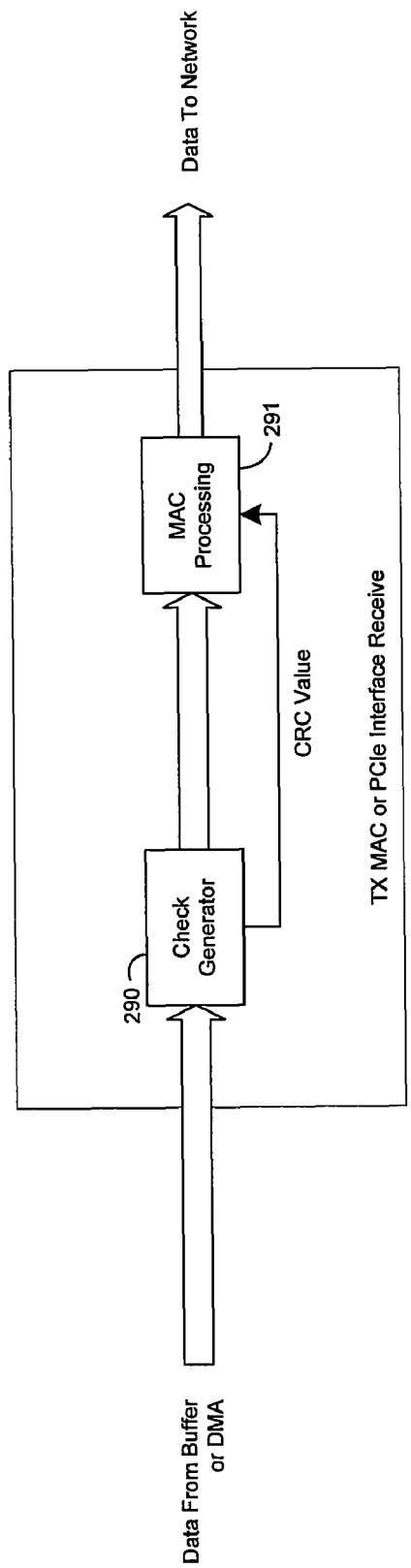
FIG. 2C is a block diagram of a CRC check value generation for packets that are being transmitted onto a network that may be utilized in connection with an embodiment of the invention.

FIG. 2C is a block diagram of a CRC check value calculation for packets that are being transmitted onto a network that may be utilized in connection with an embodiment of the invention. Referring to FIG. 2C, there is shown a CRC check generator 290 and a MAC processing block 291. The CRC check value validation may be applicable for the Ethernet TX MAC 254 or the PCIe interface 268. A packet may arrive from either a DMA or a buffer. Any header included in the CRC may have been pre-pended on the data stream. As the data arrives, a CRC value may be calculated over the packet by the CRC check generator 290. The final CRC value may be passed to the MAC processing block 291 and appended to the packet.

In FIGS. 2B and 2C, the check value may not be passed as the adapter may need to process the check value. The check value may not be useful for validation farther within the adapter as the CRC is non-associative, and may not be suited for validating the segments that may be generated or received on the other side of the adapter.

Figure 3A:
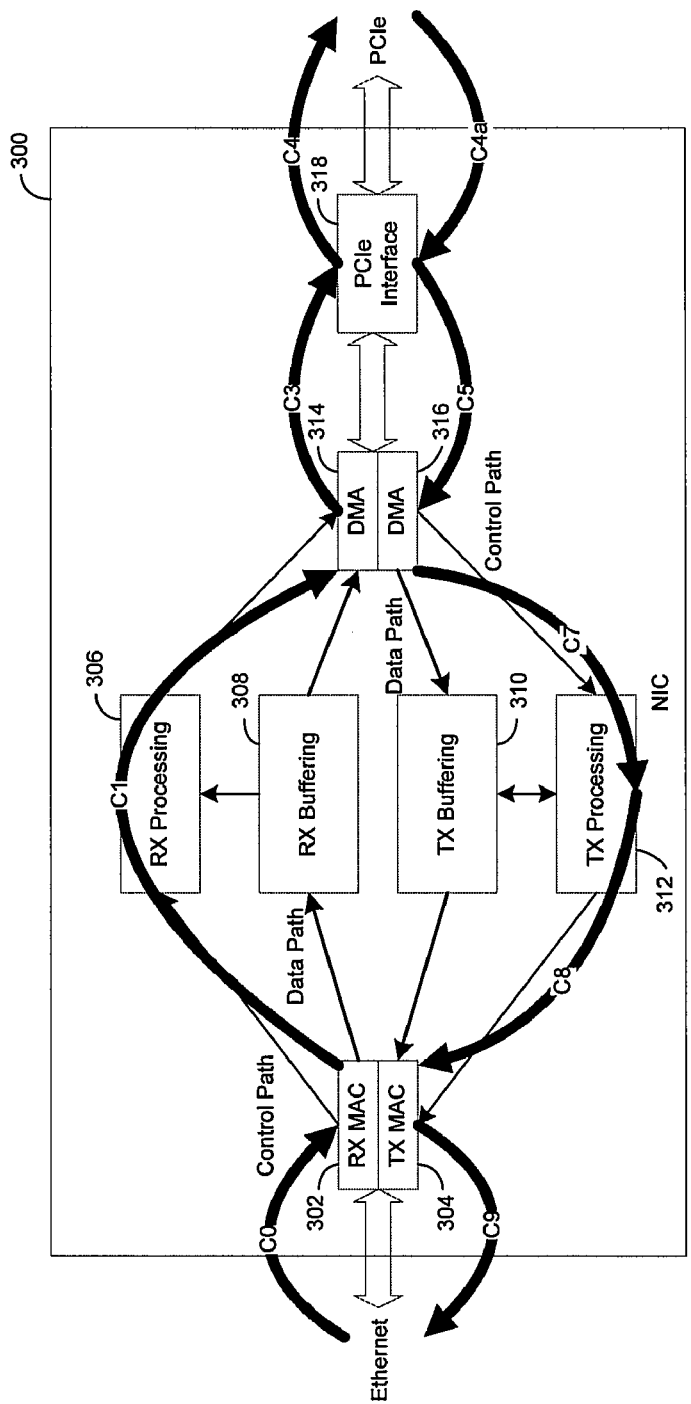
FIG. 3A is a block diagram illustrating exemplary execution of a plurality of interlocking checks within a network interface adapter, in accordance with an embodiment of the invention.

FIG. 3A is a block diagram illustrating exemplary execution of a plurality of interlocking checks within a network interface adapter, in accordance with an embodiment of the invention. Referring to FIG. 3A, there is shown a NIC or a network adapter 300. The NIC 300 may comprise a receive medium access control block (RX MAC) 302, a transmit MAC block (TX MAC) 304, a receive (RX) processing block 306, a transmit (TX) processing block 312, a RX buffering block 308, a TX buffering block 310, a write direct memory access (DMA) block 314, a read DMA block 316, and a PCIe interface 318. The various blocks in FIG. 3A may be substantially as described in FIG. 2A. Notwithstanding, the NIC 300 may be utilized to interface a first protocol and a second protocol. The first protocol and the second protocol may be, for example, Ethernet, Fiber Channel, Infiniband, PCI, PCIe, Hypertransport, SCSI, ATA, SATA, SMBus or USB.

The NIC 300 may be enabled to execute a plurality of interlocking checks. The NIC 300 may be enabled to receive check values with packets that arrive at the NIC 300. The C0 type check values may be associated with an arriving Ethernet packet and C4a type check values may be associated with an arriving PCIE packet. The NIC 300 may be enabled to generate a plurality of check values of several types, for example, C1, C2, C3, C4, C5, C7, C8, and C9 associated with a plurality of input data packets corresponding to a first protocol and a plurality of output data packets corresponding to a second protocol at a plurality of check value exchange points in the path of data traveling through the adapter or NIC 300. For example, the plurality of check values C0, C1, C2, C3, and C4 may be associated with a packet processing protocol in the RX direction while the plurality of check values types C4a, C5, C7, C8, and C9 may be associated with a packet processing protocol in the TX direction. The NIC 300 may be enabled to both validate and exchange check values for a protocol at various locations within the system.

Each check value type C0, C1, C3, C4, C4a, C5, C7, C8, and C9 may be associated with a segment of data or packet of a particular protocol type. A plurality of protocol types may be internal NIC protocols, for example, for passing data through the NIC 300. The term "interlocking check" may indicate a location in the NIC 300, where the data packets may be moved or manipulated, and an exchange from one type of check value to another may be executed. The exchange may be referred to as an "interlocking check" if the check values are either mathematically shown to indicate data integrity or the check values are executed in parallel over the same data to minimize the amount of logic without data integrity coverage.

FIG. 3A is one example of a set of check value types and verification and/or exchange locations within an adapter. The term "interlocking check values" may refer to the mechanism of a series of check value exchange points, each of which may verify one or more check values associated with one or more protocols and generate one or more new check values for one or more protocols to provide continuous data integrity coverage over a data flow through an adapter by minimizing the amount of logic that is not covered by check values by calculating check values in parallel.

The NIC 300 may be enabled to provide a high level of system data integrity by providing an interlocking check value scheme to protect both the transmit (TX) and receive (RX) paths between the integrity check value utilized on the external interface, for example, Ethernet CRC and the integrity check value utilized on the system internal interface, for example, PCIe LCRC with limited knowledge of the type of data being passed through the NIC 300. The interlocking checks may include validation and generation of the plurality of check values at various locations within the network adapter, for example, NIC 300 and limited support by the other components in the system.

In accordance with an embodiment of the invention, one or more interlocking checks may be utilized to protect both the transmit (TX) and receive (RX) paths between the integrity check value utilized on the external interface and the integrity check value utilized on the system internal interface. A first interlocking check, for example, a simple interlocking check may comprise exchanging one check value type for another when the data segment size on both sides of an interlock may be equal to one packet for the operation. A second interlocking check, for example, a simple cut-through interlocking check may comprise exchanging one check value type for another similar to the first interlocking check except that the output value may be modified in such a way as to nullify the output data packet rather than dropping it. A third interlocking check, for example, a N-to-M same type interlocking check may comprise data manipulation logic that may consume N data segments on the input side and generate M data segments on the output side and may be enclosed in an interlock. The check type of the input segments and the output segments may use a similar algorithm such that the check value associated with the input data segment may be mathematically similar to the check value associated with the output data segment. For example, the input and output check values may both be 16-bit 1's compliment checksums. A fourth interlocking check, for example, a N-to-M different type interlocking check may be similar to the N-to-M same type interlock check except that the input and output check values may use different algorithms. For example, the input check value may be a 2's compliment 16-bit checksum but the output check value may be a 16-bit 1's compliment checksum.

Referring to FIG. 3A in the RX direction, the first interlocking check, for example, the simple interlocking check may be executed in the RX MAC 302, where the non-associative 32-bit Ethernet CRC (check type C0) may be verified and exchanged for an associative 16-bit 2's compliment checksum value C1, for example. The protocol size for the RX MAC 302 interlocking check may be one complete Ethernet packet. After the RX processing block 306 determines the location(s) in the host where the packet will be placed, another interlocking check may be executed in the RX DMA block 314. This interlocking check may involve converting a single Ethernet packet into many PCIe transactions, each with its own C3 type check value. Both input values C1 and output values C3 may be 16-bit 2's compliment checksum types. The check value types may be similar and the third interlocking check, for example, may be an N-to-M same type interlocking check may be executed. The protocol size for the RX DMA 314 interlocking check may be equal to one Ethernet packet, for example. Within the PCIe Interface 318, a third interlocking check may be executed where the data link CRC is generated. In this case, for example, the simple cut-through interlocking check may be executed to exchange the C3 16-bit 2's compliment checksum value for PCIe link level 32-bit CRC value (type C4). The cut-through interlocking check may be required in order to allow nullification of the PCIe message per the PCIe specification to prevent confusion and re-transmission at the PCIe message receiver. The protocol size for the PCIe interface output interlocking check may be equal to one PCIe message (TLP).

Referring to FIG. 3A in the TX direction, the first interlocking check may occur in the PCIe interface 318, where the PCIe link level CRC value C4a may be verified. The first interlocking check, for example, the simple interlocking check may be executed to exchange the 32-bit CRC value C4a for the associative 16-bit 2's compliment check value type C5 for each PCIe message (TLP). The protocol size for the PCIe receive interlocking check may be equal to one PCIe message (TLP). The DMA read block 316 may be enabled to executed the next interlocking check utilizing the fourth interlocking check, for example, the N-to-M different type interlocking check as it may allow the current TCP checksum generation logic within the DMA read block 316 to serve as part of the interlocking check. This interlocking check may process each PCIe transaction and generate a TCP compatible 16-bit 1's compliment checksum value C7. The protocol size for the DMA read block 316 may be equal to one Ethernet packet. The TX processing block 312 may generate headers and modify the payload that was read from the host. The third interlocking check, for example, the N-to-M same type interlocking may be executed so that the output of the TX processing block 312 may be a single Ethernet packet, and the check value at the TX processing block 312 output, C8 may be in the same 16-bit 1's compliment format as C7. If the payload of host data needs to be modified, then the C7 value may be updated by the TX processing block 312 to compensate for the updated payload value. In the TX MAC 304 block, the 16-bit 1's compliment check value C8 may be exchanged with the Ethernet 32-bit CRC by executing the second interlocking check, for example, the simple cut-through interlocking check. The protocol size for the TX processing block 312 and the TX MAC 304 interlocks may be equal to one Ethernet packet.

In accordance with an embodiment of the invention, the term "interlocking check values" may refer to data flowing through the adapter or NIC 300 as illustrated in FIG. 3A and the flowing data may be covered by one or more check values. The check values may be converted with "interlocking check" points within the NIC 300. The "interlocking check values" may provide an enhanced level of data integrity compared to the system shown in FIG. 2A.

Figure 3B:
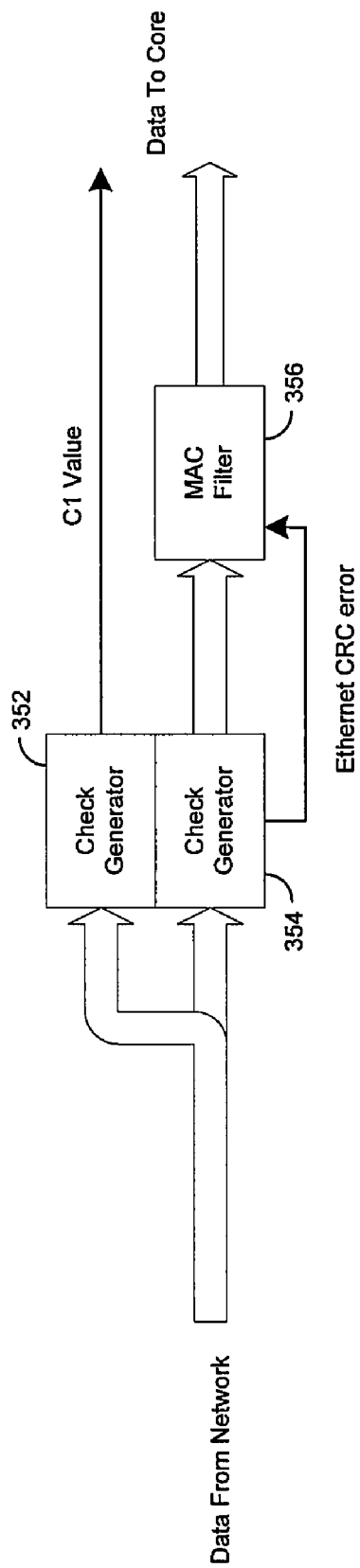
FIG. 3B is a block diagram illustrating generation of an exemplary simple interlocking check, in accordance with an embodiment of the invention.

FIG. 3B is a block diagram illustrating generation of an exemplary simple interlocking check, in accordance with an embodiment of the invention. Referring to FIG. 3B, there is shown a first check generator 352, a second check generator 354, and a MAC filter 356.

The first check generator 352 may comprise suitable logic, circuitry and/or code that may be enabled to generate a check value, for example, C1 associated with a received data packet. The second check generator 354 may comprise suitable logic, circuitry and/or code that may be enabled to generate and check a second check value, for example a CRC check value for the received data packet and compare this value to the input check value, for example, the 32-bit CRC at the end of the data packet and communicate the pass or fail condition to the MAC filter 356. The first check generator 352 and the second check generator 354 may be enabled to receive the same data packet at the same time to minimize the amount of logic that is not provided data integrity coverage by either check value.

The MAC filter 356 may comprise suitable logic, circuitry and/or code that may be enabled to act on the pass or fail condition from the second check generator 354. If the CRC value of the received data packet fails, the MAC filter 356 may be enabled to block the received data packet or mark it for later dropping. If the CRC value of the received data packet passes, the MAC filter 356 may be enabled to allow the received data packet for further processing. The simple interlocking check may be suitable when there is one input and one output segment for an operation. The two generated check value types may be of a same type or a different type as the check values are calculated in parallel over the same data and may not be required to be mathematically related.

Figure 4:
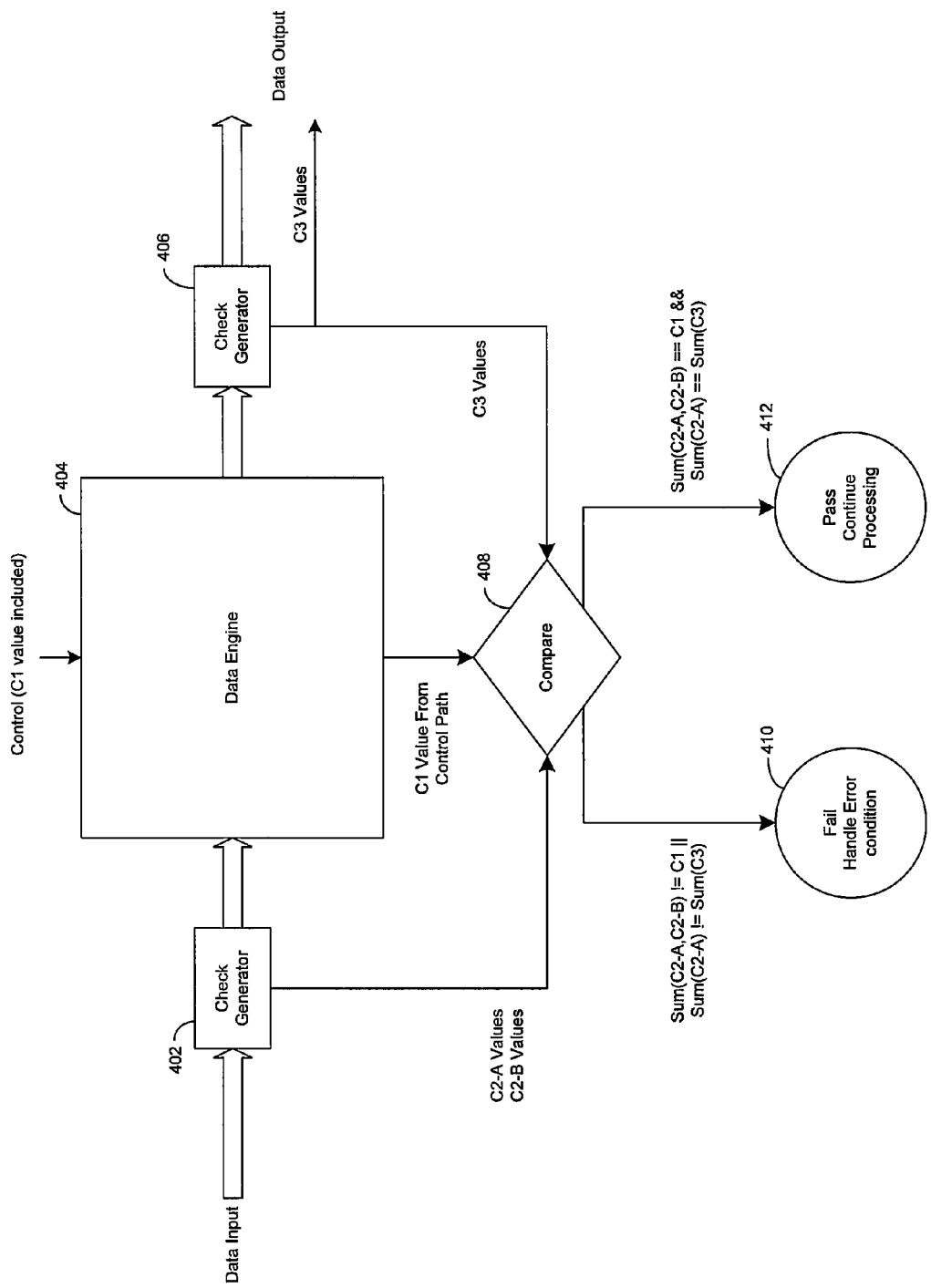
FIG. 4 is a block diagram illustrating an exemplary interlocking check capable of handling a plurality of input data packets and a plurality of output data packets associated with a particular protocol, in accordance with an embodiment of the invention.

FIG. 4 is a block diagram illustrating an exemplary interlocking check capable of handling a plurality of input data packets associated with a first protocol and a plurality of output data packets associated with a second protocol, in accordance with an embodiment of the invention. Referring to FIG. 4, the data engine 404 may be enabled to perform data processing as required as a part of the adapter. The data processing may comprise combining of packets, segmentation of packets, header stripping or adding and data bus alignment, for example. The data engine 404 may receive a control command which may indicate the data processing or manipulation required for the operation and may comprise a check value C1 for the operation. The control command may cause a plurality of data packets to arrive at the data input. The processing may combine, drop or separate these data packets to create a plurality of output data packets. The data engine 404 may indicate to the input check generator 402 whether the input data segment may be completely used in one or more output data packets or may be dropped. The data engine 404 may be enabled to ensure that all data packets associated with the C1 check value are presented at the data input. When the processing of the control command is complete, the data engine 404 may forward the C1 check value to the compare block 408.

A first check generator 402 may be enabled to generate a check value for each data segment that may arrive at the data engine 404. If the input data segment includes data that may be passed to output data packets by the data engine 404, the check value output of the check generator 402 may be C2-A, for example. If the input data segment includes data that may not be passed to output data packets by the data engine 404, then the check value output of the check generator 402 may be C2-B, for example. The check values output by check generator 402 may be communicated to the compare block 408.

A second check generator 406 may generate a check value of type C3 for each data segment output by the data engine 404. The check generator 406 may forward this check value C3 along with the data segment to the compare block 408.

The compare block 408 may then execute a mathematical operation to indicate data integrity between the input data and the C1 check value and execute another mathematical operation between the input data and the output data. If both checks pass, then control may be passed to the pass block 412 so that control path may continue operation. If either check fails, then control may be passed to the fail block 410 for handling of the error condition.

An N-to-M same type interlocking check may be executed in the DMA write block 314, for example, in the NIC 300. The check value (C1) may be generated in the RX MAC 302 at the same location where the Ethernet CRC is verified. This check value C1 may be associated with the Ethernet packet protocol in the control path to the RX processing block 306 while the actual content of the packet may be placed in the RX buffering block 308. This check value C1 may cover, for example, a predefined segment of the packet such as the whole packet, including headers and CRC. Not withstanding, the invention may not be limited to a predefined segment.

The RX processing block 306 may pass the check value C1 along with the various DMA write block 314 commands to the data engine 404. The commands may comprise one or more requests to move a segment of the packet from the RX buffering block 308 to a particular address location in the host. As the data engine 404 operates on the command, the input and output data segments may generate the C2-A, C2-B, and C3 check values as described herein.

In addition to reading the data that is to be placed in the host, the data engine 404 may also read each of the segments of the packet not communicated to the host and may discard the data. For example, a C2-B check value may be generated, which may be associated with the segments of the packet not communicated to the host. For example, a C2-B check value may be generated, which may be associated with a VLAN tag for a NIC or L2, L3, L4 headers and L2 CRC for a TCP offload NIC where these headers are not placed in the host.

When the protocol is complete as signaled by the data engine 404, the compare block 408 may determine whether a combination, for example, a sum of a set of check values, for example, a sum of the generated C2-A and C2-B check values is equal to the generated check value C1. The compare block 408 may determine whether a combination, for example, a sum of the set of check values, for example, sum (C2-A) is equal to the sum of generated check values C3. If the sum of the set of check values, for example, a sum of the generated C2-A and C2-B check values is not equal to the generated check value C1 or the sum of the set of check values, for example, sum (C2-A) is not equal to the sum of generated check values C3, then an indication may be communicated to the fail block 410. In fail block 410, the NIC 300 may be enabled to block the indication of the received input data to the host. The fail block 410 may handle a failed check in other ways, for example, by causing a retransmit request from the adapter onto the Ethernet network. If the sum of the set of check values, for example, a sum of the generated C2-A and C2-B check values is equal to the generated check value C1 and the sum of the set of check values, for example, sum (C2-A) is equal to the sum of the generated check values C3, then an indication may be communicated to the pass block 412. In pass block 412, the NIC 300 may be enabled to allow indication of the received packet to the host for further processing. While the DMA write block 314 was used as an example of the N-to-M same type interlock check value scheme, other adapter architectures may use this type of interlocking check at other locations within the adapter 300.

Figure 5:
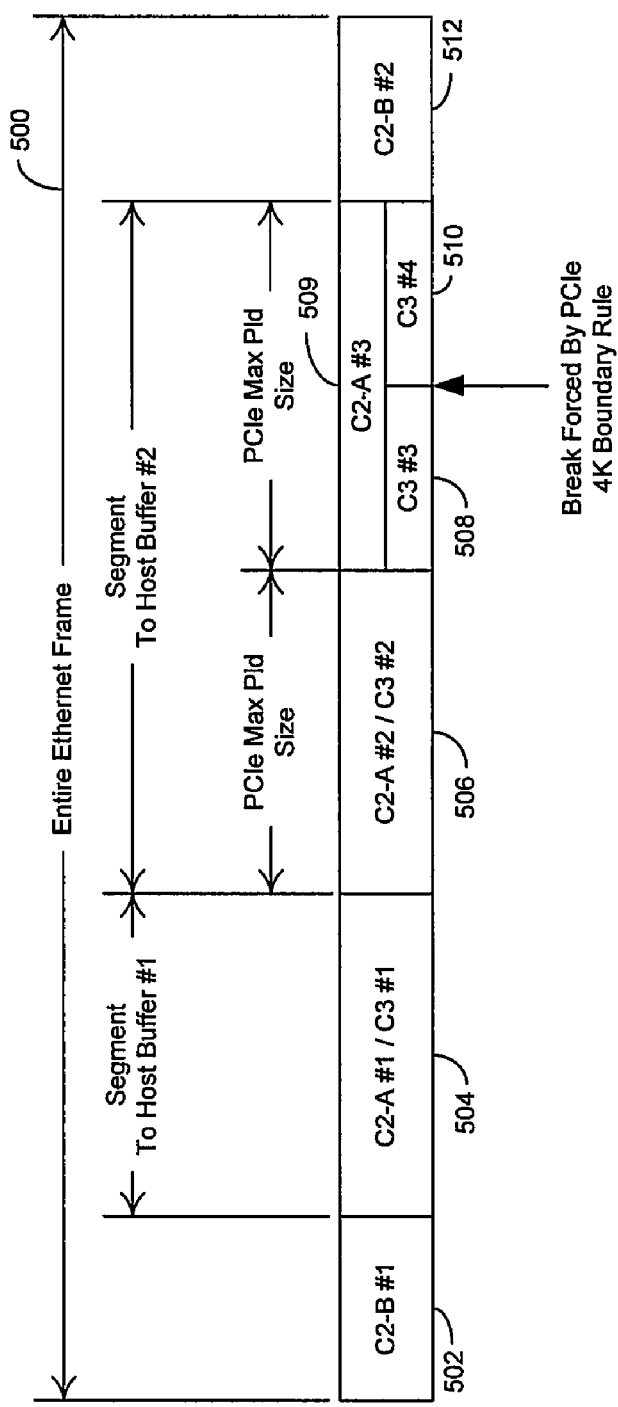
FIG. 5 is a block diagram illustrating exemplary check values associated with various segments of an Ethernet packet, in accordance with an embodiment of the invention.

FIG. 5 is a block diagram illustrating exemplary check values associated with various segments of an Ethernet packet, in accordance with an embodiment of the invention. FIG. 5 attempts to illustrate the input/output segments that may be supported by the DMA read block 316 as shown in FIG. 3A. Referring to FIG. 5, there is shown an Ethernet packet 500. The Ethernet packet 500 may be split into a plurality of segments. A check value may be generated, which may be associated with each segment or portion of the Ethernet packet 500.

A plurality of check values C2-B #1 and C2-B #2 may be generated, which may be associated with segments 502 and 512. The plurality of check values C2-B #1 and C2-B #2 may indicate that the segments 502 and 512 are not output from the DMA read block 316 and are not placed into host buffers. The 502 and 512 may comprise the Ethernet L3 and L4 headers and the Ethernet CRC. A plurality of check values C2-A #1 and C3 #1 may be generated, which may be associated with the segment 504 that may be communicated to the host buffer #1. A plurality of check values C2-A #2 and C3 #2 may be generated, which may be associated with the segment 506 that may be communicated to the host buffer #2. A check value C2-A #3 may be generated, which may be associated with the input data segment 509. A check value C3 #3 may be generated, which may be associated with the output data segment 508 that may be communicated to the host buffer #2. A check value C3 #4 may be generated, which may be associated with the output data segment 510 that may be communicated to the host buffer #2. The Ethernet packet 500 may be split based on, for example, PCIe maximum payload size limitations, 4K boundary limitations, or other interface limitations. The DMA resource or DMA write block 314 or data engine 404 may be enabled to issue a read command to the RX buffering block 308, and split it into multiple operations before communicating the packet to the PCIe interface 318. In this case, all C2-A type check values may be represented by a single result.

In this example, the DMA write 314 performed 5 read operations from the RX buffering block 308. The first and last read operations may be discarded and generated no output data segments to the PCIe Interface 318. The first and last read operations may be discarded because they comprised, for example, a L2 header and a L2 CRC value in the C1 check value, but not to be placed in the host. The second and third input segments may be each passed as separate output segments. The boundary between these two segments may be caused, for example, by the need to place the data into separate buffers within the host. The fourth input segment may be split into two output segments by the DMA write block 314 as PCIe may not transmit a segment that crosses the 4KB boundary. The DMA write block 314 may split the input segment into two output segments automatically so that the PCIe rule is met.

Figure 6:
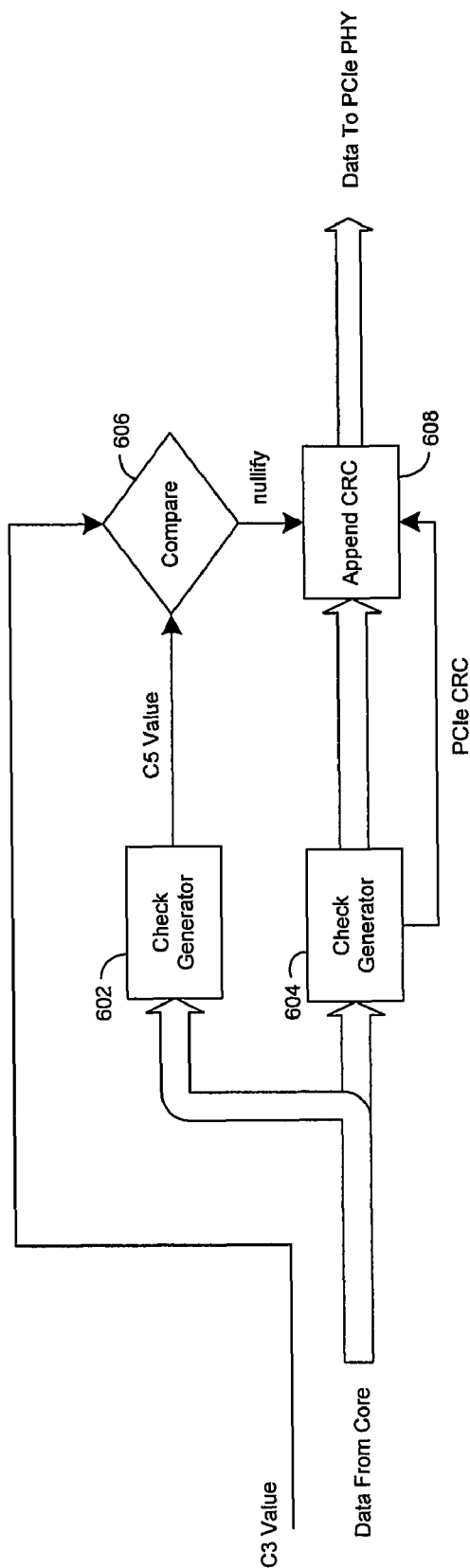
FIG. 6 is a block diagram illustrating an exemplary cut through interlocking check, in accordance with an embodiment of the invention.

FIG. 6 is a block diagram illustrating an exemplary cut through interlocking check, in accordance with an embodiment of the invention. The cut through interlocking check may be executed in the PCIe interface 318 or the TX MAC 304, for example. Referring to FIG. 6, there is shown a first check generator 602, a second check generator 604, a compare block 606, and an append CRC block 608.

The first check generator 602 may comprise suitable logic, circuitry and/or code that may be enabled to generate a check value, for example, C5 associated with an input data segment, for example, the 16-bit 2's compliment checksum associated with DMA write block output packet as a PCIe message (TLP). The second check generator 604 may comprise suitable logic, circuitry and/or code that may be enabled to generate a second check value, for example, a PCIe LCRC check value for the TLP to be transmitted. The second check generator 604 may be enabled to communicate the generated check value C4 to the append CRC block 608. The first check generator 602 and the second check generator 604 may be enabled to receive the same packet at the same time in order to minimize the amount of logic not provided by data integrity coverage by one of the check values.

The compare block 606 may be enabled to compare the generated check values C3 and C5. If the generated check values C3 and C5 are equal, the compare block 606 may indicate to the append CRC block 608 to append the check value C4 to the packet and complete transmission of the packet. If the generated check values C3 and C5 are not equal, the compare block 606 may indicate to the append CRC block 608 to nullify the packet to be transmitted by inverting the CRC value and generating a special stop code per PCIe specification. In the TX MAC 304, the CRC value may be inverted to cause a CRC error at the Ethernet MAC that receives the packet.

The simple cut-through interlocking check may be similar to the simple interlocking check and may be enabled to change the check value type, but the input and output data segments may be similar and one input and one output data segment may be handled per protocol.

Figure 7:
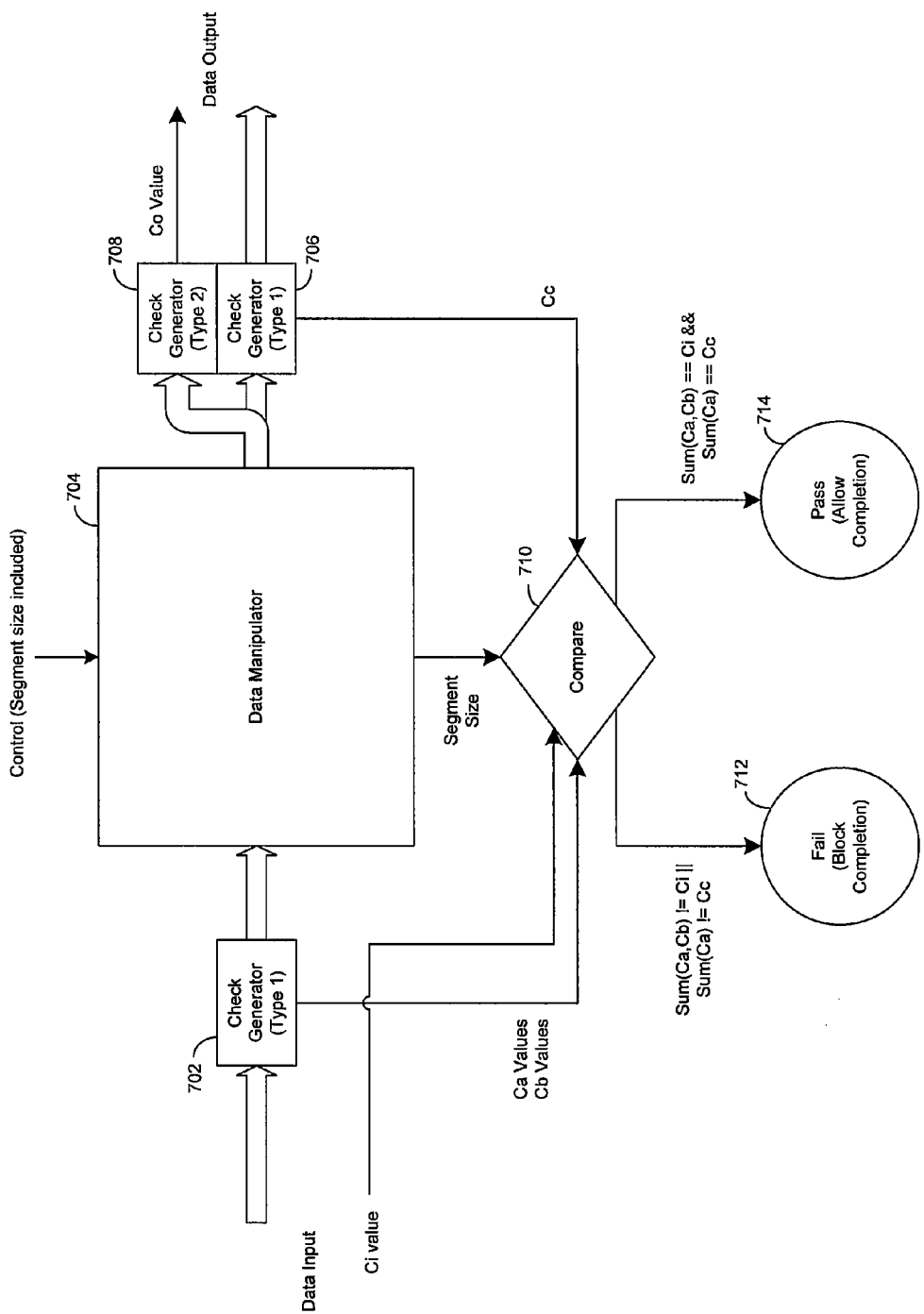
FIG. 7 is a block diagram illustrating an exemplary N-to-M different type interlocking check, in accordance with an embodiment of the invention.

FIG. 7 is a block diagram illustrating an exemplary N-to-M different interlocking check, in accordance with an embodiment of the invention. The N-to-M different interlocking check may be executed in the DMA read block 316, for example. Referring to FIG. 7, processing may begin when a control command enters the data engine 704. The control command may comprise a plurality of input and/or output segment operations to perform for a particular protocol. The data engine 704 may receive all the data for the protocol at its input and the data engine 704 may indicate whether a segment is used in an output segment or not similar to the N-to-M same interlocking check.

The input check generator 702 may be enabled to generate a check value for each input data segment. A plurality of check values, for example, Ca and Cb may be generated by the check generator 702. The check value Ca may be associated with the input data segments of the protocol that may be processed to generate output data segments but may not be included in the Ci check value. The check value Cb may be associated with the input data segments of the protocol that may not be processed to generate output data segments. The check generator 702 may forward the Ca and Cb check values to the compare block 710.

A check value, Ci may be associated with each input data segment. In our example application, these check values may be generated by the PCIe interface 318 at the same location where the PCIe CRC is verified and indicated as C5 in FIG. 3A. The Ci values may be forwarded to the compare block 710.

The data engine 704 may process the input segments and generate corresponding output data segments associated with the protocol. In our example application, these output data segments may be TLP payloads that are to be placed in the TX buffering block 312. The output check value generator 706 may use a similar check value type calculation of the Ci check values and the those generated by the check generator 702. For example, these check values may be 16-bit 2's compliment checksums (Type 1) and may operate on each output data segment. As the data is written to the TX buffering block 310, a check value Cc may be generated by the check generator 706 associated with each of the output data segments. The check generator 706 may forward the Cc values to the compare block 710. In parallel, the check value generator 708 may operate on each output data segment. As the data is written to the TX buffering block 310, a check value Co may be generated for each output data segment. In our example application, the sum of the Co values may be equal to C7 as illustrated in FIG. 3A. The sum of the Co values may be equal to the 16-bit 1's compliment checksum of the packet communicated to the TX processing block 312.

In the compare block 710, it may be determined whether a combination, for example, a sum of a set of check values, for example, a sum of the generated Ca and Cb check values for each input data segment of the protocol is equal to the sum of the generated check values Ci of each input data segment of the protocol. In step 710, it may be determined whether a combination, for example, a sum of the set of check values, for example, sum (Ca) of each input data segment of the protocol is equal to the sum of the generated check values Cc of each output data segment of the protocol. If the sum of the set of check values, for example, a sum of the generated Ca and Cb check values is not equal to the sum of the generated check values Ci or the sum of the set of check values, for example, sum (Ca) is not equal to the sum of the generated check values Cc, an indication may be communicated to the fail block 710. In the fail block 710, the NIC 300 may be enabled to block the data packet to be transmitted. If the sum of the set of check values, for example, a sum of the generated Ca and Cb check values is equal to the sum of the generated check values Ci and the sum of the set of check values, for example, sum (Ca) is equal to the sum of the generated check values Cc, control passes to pass block 712. In pass block 712, the NIC 300 may be enabled to allow the packet to be transmitted by passing control to the TX processing block 312.

The N-to-M different type interlocking check may support a different check type algorithm with the input data segments as is generated with the output data segments by calculating two check values in parallel on the output data segments. The Ca and Cb values in our example application may be the same type as Ci check values. The Co check values that correspond to the data output from the block may be a different type of check value as no mathematical relation may be required to verify data integrity for the limited logic between the two data output check generators.

The TX processing block 312 may be enabled to modify the packet to be transmitted. This may be another type of interlocking check. For example, the TX processing block 312 may be enabled to modify the data in the packet to be transmitted that is covered by the C7 check value which arrived from the TX block 316. For example, in the TCP checksum offload, the NIC may calculate the TCP checksum and insert the value into the packet header, which may be created by the host. The TX processing block 312 may be enabled to subtract the TCP checksum value that was in the TCP header created by the host and moved by the TX DMA block from the C7 check value and add the TCP checksum value calculated for the packet by the NIC to the C7 check value to create the C8 check value that may be communicated to the TX MAC 304. Another example of manipulation by the TX processing block 312 may be any header data added to the packet that was not read from the host may be added to the C8 check value that may be passed to the TX MAC 304. When the packet is ready for transmission from the TX MAC 304, the TX processing block 312 may communicate the control information for the packet to the TX MAC 304. The TX MAC 304 may be enabled to transmit the packet and verify the packet based on the generated check value C8. In parallel, by executing the simple cut-through interlocking check, the Ethernet 32-bit CRC may be generated and appended to the packet.

The interlocking checks between the network data and/or check value and the host data and/or check value may have the advantage of being able to provide data integrity over the network adapter regardless of the higher level protocols in use. All data packets may receive the same protection regardless of the higher level protocol they use. The interlocking checks may be useful for general purpose network adapters such as adapters for Ethernet or Infiniband and single purpose adapters such as SCSI and Fibre channel.

In accordance with another embodiment of the invention, the offloads executed within the adapter may also be protected by the interlocking checks. For example, TCP checksum offload may be protected. If the data is corrupted within the adapter, the packet may be nullified on transmit or dropped before it leaves the adapter even if the TCP checksum calculated within the adapter was over corrupted data. For example, if a bit value is changed in the TX Buffering block 310 due to an alpha particle, this change may not be covered in the C7 or C8 check values, so when the packet is being checked in the TX MAC 304, the error may be detected and the CRC value on the Ethernet network may be corrupted.

The interlocking check may be easy to implement. The interlocking check may overcome the complexity caused by mismatch of the maximum message sizes between the networks and the variations in data manipulation caused by existing offload features. The existing data manipulation engines may be wrapped with check generators. The modifications to the data manipulation engines may be minimal to provide indication of data packet types for inclusion and/or exclusion in data integrity calculations. The four types of interlocking checks provided may be able to handle a plurality of data manipulation problems. In another embodiment, different types of check values may support different types of data manipulations.

In accordance with an embodiment of the invention, a method and system for interlocking data integrity for network adapters may comprise executing a plurality of interlocking checks within a network adapter, for example, NIC 300. Each interlocking check may comprise receiving a plurality of input check values associated with a plurality of input data packets corresponding to a first protocol. A plurality of check values may be generated which are associated with the plurality of input data packets and a plurality of output data packets corresponding to a second protocol. The data integrity of the plurality of input data packets and the plurality of output data packets may be validated based on one or more comparisons between one or more of the generated plurality of check values and one or more of the received plurality of input check values.

The data integrity of the plurality of input data packets and the plurality of output data packets may be validated based on one or more comparisons between the generated plurality of check values associated with the plurality of input data packets and the generated plurality of check values associated with the plurality of output data packets. At least one of the plurality of input data packets and the plurality of output data packets may be blocked when the validation fails.

The plurality of input data packets corresponding to the first protocol and the plurality of output data packets corresponding to the second protocol second protocols may be one of: Ethernet packets, Fiber Channel packets, Infiniband packets, peripheral component interconnect (PCI) packets, PCI Express (PCIe) packets, Hypertransport packets, small computer system interface (SCSI) packets, advanced technology attachment (ATA) packets, serial ATA (SATA) packets, system management bus (SMBus) packets, internal NIC data flow packets and universal serial bus (USB) packets. The type of the plurality of input check values and the generated plurality of check values may be one of: a CRC and a checksum. Notwithstanding, the plurality of input check values and the generated plurality of check values may not necessarily be of the same type.

Another embodiment of the invention may provide a machine-readable storage, having stored thereon, a computer program having at least one code section executable by a machine, thereby causing the machine to perform the steps as described above for interlocking data integrity for network adapters.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing packets, the method comprising:
   in a network adapter:
   validating integrity of a received plurality of input data packets corresponding to a first protocol and a plurality of output data packets corresponding to a second protocol, based on a generated plurality of check values associated with said received plurality of input data packets and said plurality of output data packets; and
   executing a plurality of interlocking checks within said network adapter, based on said validated integrity of said received plurality of input data packets and said plurality of output data packets.

2. The method according to claim 1, comprising receiving a plurality of input check values associated with said received plurality of input data packets corresponding to said first protocol.

3. The method according to claim 2, comprising validating integrity of said received plurality of input data packets and said plurality of output data packets based on one or more comparisons between one or both of: said generated plurality of check values and/or said received plurality of input check values.

4. The method according to claim 2, wherein a type of said received plurality of input check values and a type of said plurality of generated check values is one of a cyclic redundancy check (CRC) or a checksum.

5. The method according to claim 1, comprising executing a first of said plurality of interlocking checks within said network adapter based on exchanging one check value type for another check value type when a data segment size on both sides of an interlock is equal to one of said received plurality of input data packets.

6. The method according to claim 1, comprising executing a second of said plurality of interlocking checks within said network adapter based on exchanging one check value type for another check value type in order to nullify one of said plurality of output data packets.

7. The method according to claim 1, comprising executing a third of said plurality of interlocking checks within said network adapter based on converting at least a portion of said received plurality of input data packets into at least a portion of said plurality of output data packets, wherein a same algorithm is used to calculate said generated plurality of check values on both sides of an interlock.

8. The method according to claim 1, comprising executing a fourth of said plurality of interlocking checks within said network adapter based on converting at least a portion of said received plurality of input data packets into at least a portion of said plurality of output data packets, wherein a different algorithm is used to calculate said generated plurality of check values on both sides of an interlock.

9. The method according to claim 1, comprising validating integrity of said received plurality of input data packets and said plurality of output data packets based on one or more comparisons between said generated plurality of check values associated with said received plurality of input data packets and said generated plurality of check values associated with said plurality of output data packets.

10. The method according to claim 1, comprising blocking one or both of: said received plurality of input data packets and/or said plurality of output data packets when said validated integrity fails.

11. A system for processing packets, the system comprising:
one or more circuits for use in a network adapter, said one or more circuits being operable to:
validate integrity of a received plurality of input data packets corresponding to a first protocol and a plurality of output data packets corresponding to a second protocol, based on a generated plurality of check values associated with said received plurality of input data packets and said plurality of output data packets; and
execute a plurality of interlocking checks within said network adapter, based on said validated integrity of said received plurality of input data packets and said plurality of output data packets.

12. The system according to claim 11, wherein said one or more circuits are operable to receive a plurality of input check values associated with said received plurality of input data packets corresponding to said first protocol.

13. The system according to claim 12, wherein said one or more circuits are operable to validate integrity of said received plurality of input data packets and said plurality of output data packets based on one or more comparisons between one or both of: said generated plurality of check values and/or said received plurality of input check values.

14. The system according to claim 12, wherein a type of said received plurality of input check values and a type of said plurality of generated check values is one of a cyclic redundancy check (CRC) or a checksum.

15. The system according to claim 11, wherein said one or more circuits are operable to execute a first of said plurality of interlocking checks within said network adapter based on exchanging one check value type for another check value type when a data segment size on both sides of an interlock is equal to one of said received plurality of input data packets.

16. The system according to claim 11, wherein said one or more circuits are operable to execute a second of said plurality of interlocking checks within said network adapter based on exchanging one check value type for another check value type in order to nullify one of said plurality of output data packets.

17. The system according to claim 11, wherein said one or more circuits are operable to execute a third of said plurality of interlocking checks within said network adapter based on converting at least a portion of said received plurality of input data packets into at least a portion of said plurality of output data packets, wherein a same algorithm is used to calculate said generated plurality of check values on both sides of an interlock.

18. The system according to claim 11, wherein said one or more circuits are operable to execute a fourth of said plurality of interlocking checks within said network adapter based on converting at least a portion of said received plurality of input data packets into at least a portion of said plurality of output data packets, wherein a different algorithm is used to calculate said generated plurality of check values on both sides of an interlock.

19. The system according to claim 11, wherein said one or more circuits are operable to validate integrity of said received plurality of input data packets and said plurality of output data packets based on one or more comparisons between said generated plurality of check values associated with said received plurality of input data packets and said generated plurality of check values associated with said plurality of output data packets.

20. The system according to claim 11, wherein said one or more circuits are operable to block one or both of: said received plurality of input data packets and/or said plurality of output data packets when said validated integrity fails.

* * * * *